(12) United States Patent
Hertwig et al.

(10) Patent No.: US 8,508,844 B2
(45) Date of Patent: Aug. 13, 2013

(54) HYBRID FIBER-MOPA

(75) Inventors: Michael Hertwig, San Ramon, CA (US); Norman Hodgson, Belmont, CA (US); Luis A. Spinelli, Sunnyvale, CA (US)

(73) Assignee: Coherent, Inc., Santa Clara, CA (US)

( * ) Notice: Subject to any disclaimer, the term of this patent is extended or adjusted under 35 U.S.C. 154(b) by 426 days.

(21) Appl. No.: 12/821,026

(22) Filed: Jun. 22, 2010

(65) Prior Publication Data

US 2011/0310468 A1 Dec. 22, 2011

(51) Int. Cl.
*H01S 3/23* (2006.01)

(52) U.S. Cl.
USPC .......................................... 359/347; 359/333

(58) Field of Classification Search
USPC .................................... 359/333, 341.1, 347
See application file for complete search history.

(56) References Cited

U.S. PATENT DOCUMENTS

| | | | |
|---|---|---|---|
| 6,577,666 | B2 | 6/2003 | Erhard et al. |
| 6,778,580 | B2 | 8/2004 | Erhard et al. |
| 6,873,639 | B2 * | 3/2005 | Zhang .............................. 372/69 |
| 6,885,683 | B1 * | 4/2005 | Fermann et al. .................. 372/25 |
| 7,289,263 | B1 | 10/2007 | Starodoumov et al. |
| 7,593,437 | B2 | 9/2009 | Staroudoumov et al. |
| 7,593,440 | B2 | 9/2009 | Spinelli et al. |
| 2005/0041702 | A1 | 2/2005 | Fermann et al. |
| 2005/0201429 | A1 * | 9/2005 | Rice et al. ........................ 372/27 |
| 2011/0157689 | A1 * | 6/2011 | Lundquist et al. ............ 359/347 |

OTHER PUBLICATIONS

U.S. Appl. No. 12/759,465, filed Apr. 13, 2010, by Michael Hertwig et al., entitled "Polarization Maintaining Multi-Pass Imaging System for Thin-Disk Amplifiers and Oscillators," 33 pages in length.
C.D. Brooks et al., "1-mJ energy, 1-MW peak-power, 10-W average-power, spectrally narrow, diffraction-limited pulses from a photonic-crystal fiber amplifier," *Optics Express*, vol. 13, No. 22, Oct. 31, 2005, pp. 8999-9002.
G. Chang et al., "100 W Femtosecond Yb-Fiber CPA System based on Chirped-Volume-Bragg-Gratings," *CLEO* (2008), 2 pages in length.
M.J. Leonardo et al., "Fiber amplifier based UV laser source," *SPIE* (2009) (*Fiber Lasers VI: Technology, Systems, and Applications*), vol. 7195, pp. 71950F-1 thru 71950F-10.
K-H. Liao et al., "Large-aperture chirped volume Bragg grating based fiber CPA system," *Optics Express*, vol. 15, No. 8, Apr. 16, 2007, pp. 4876-4882.
J. Limpert et al., "High Repetition Rate Gigawatt Peak Power Fiber Laser Systems: Challenges, Design, and Experiment," *IEEE Journal of Selected Topics in Quantum Electronics*, vol. 15, No. 1, Jan./Feb. 2009, pp. 159-169.

(Continued)

*Primary Examiner* — Mark Hellner
(74) *Attorney, Agent, or Firm* — Morrison & Foerster LLP

(57) ABSTRACT

A master oscillator power-amplifier stages includes multiple stages of fiber-amplification with a final power amplifier stage in the form of a multi-pass amplifier. With a thin-disk gain medium in one example the thin-disk amplifier includes a common optical arrangement for providing multiple incidences of radiation to be amplified and multiple incidences of a pump-radiation beam on the thin-disk gain medium.

13 Claims, 7 Drawing Sheets

(56) References Cited

OTHER PUBLICATIONS

L. Shah et al., "High-Power Ultrashort-Pulse Fiber Amplifiers," *IEEE Journal of Selected Topics in Quantum Electronics*, vol. 22, No. 3, May/Jun. 2007, pp. 552-558.

Y. Zaouter et al., "Transform-limited 100 µJ, 340 MW pulses from a nonlinear-fiber chirped-pulse amplifier using a mismatched grating stretcher-compressor," *Optics Letters*, vol. 33, No. 13, pp. 1527-1529.

International Search Report and Written Opinion received for PCT Patent Application No. PCT/US2011/041102, mailed on Sep. 2, 2011, 13 pages.

Yang et al., "Multipass Ti:Sapphire Amplifier Based on a Parabolic Mirror", Optics Communications, vol. 234, 2004, pp. 385-390.

International Preliminary Report on Patentability received for PCT Patent Application No. PCT/US2011/041102, mailed on Jan. 10, 2013, 9 pages.

* cited by examiner

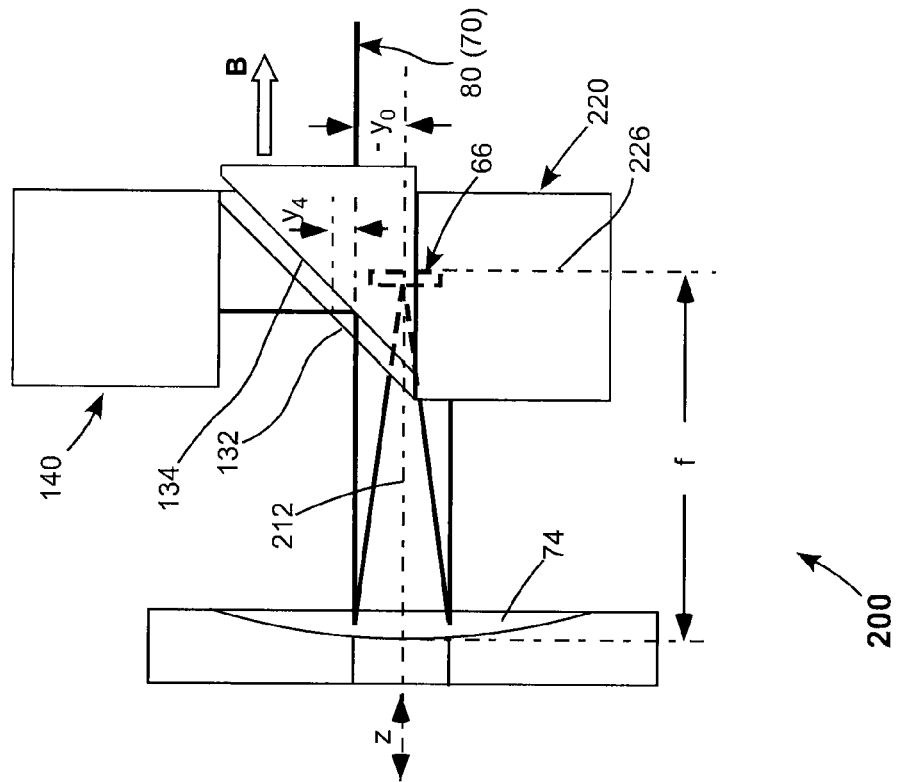
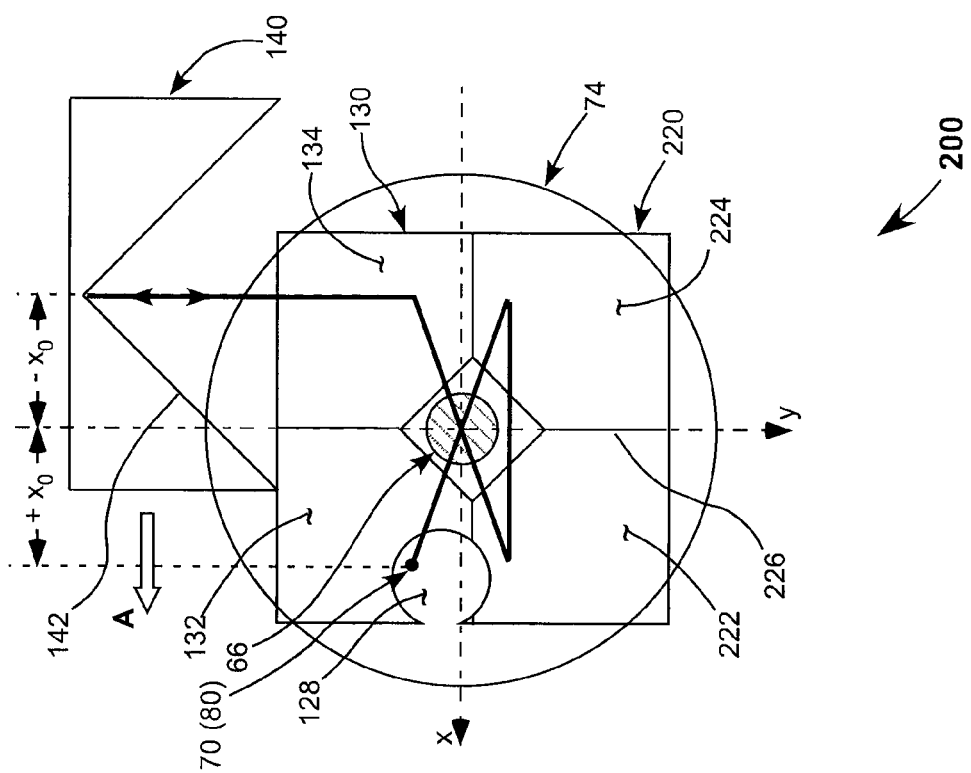
FIG. 6B
FIG. 6A

HYBRID FIBER-MOPA

TECHNICAL FIELD OF THE INVENTION

The present invention relates in general to laser master oscillator power amplifier systems (MOPAs). The invention relates in particular to fiber MOPAs including a master oscillator providing seed pulses to a fiber-amplifier including a plurality of fiber preamplifier amplifier stages and a final fiber power-amplifier stage.

DISCUSSION OF BACKGROUND ART

Fiber MOPAs, including frequency converted fiber MOPAs are increasingly being used in applications where frequency-converted solid lasers were previously used. Such applications include micro-machining/materials processing and wafer inspection. Fiber laser and fiber-amplifier systems have certain advantages over solid state lasers. These advantages include more efficient use of pump power, permanence of alignment, and in many instances a convenience of packaging which is due to the fact that amplifier fibers can be coiled in an enclosure.

A principal advantage of a fiber-amplifier is a high gain (increase of average power and pulse energy by a factor of up to 1,000) combined with a low saturation energy and low saturation power. High gain and low saturation energies allow the use of low power, pulsed seed lasers, which in turn opens up the parameters space of laser performance in terms of repetition rate and pulse duration. This is because pulse durations in the nanosecond and sub-nanosecond regime and repetition rates above several hundred kilohertz (kHz) can only be realized in micro-chip solid-state lasers and pulsed or modulated-CW diode lasers. Both of these laser types exhibit low output power, for example less than about 100 milliwatts (mW).

FIG. 1 schematically illustrates a general layout 10 of a prior-art fiber MOPA having a low-power seed source 12. Seed source 12 can be either a pulsed laser or a continuous wave (CW) laser. Pulsed lasers are usually mode-locked lasers providing short duration pulses (nanoseconds or less) at repetition rates of a few megahertz (MHz). Output of laser 12 is passed via an isolator 14 to one or more fiber preamplifier stages 16 which amplify the seed radiation to an average power of about 100 mW.

The pre-amplified radiation is delivered to a device 18, which establishes the output pulse repetition frequency (PRF) for MOPA 10. If the seed radiation is CW radiation, device 18 is a modulator such as an electro-optic (E-O) or an acousto-optic (A-O) modulator. If the seed radiation is pulsed radiation, device 18 is a pulse-picker which reduces the seed pulse PRF by selecting every $N^{th}$ one of the input pulses and discarding the remainder. The PRF out of device 18 may be between about 10 kilohertz (kHz) and a several megahertz (MHz).

As a result of the modulation or pulse-picking the average power output of device 18 can be reduced to about 1 mW. After being passed through an isolator 22, this output is "re-amplified" by one or more fiber preamplifier stages 20. Several pre-amplifiers are usually used to increase the output power of amplifier stages 20 to about the single Watt level. The numbers of pre-amplifiers used depends on the average power of the seed source and the duty-cycle (PRF) reduction by device 18.

The lower the seed source average output power and the lower the final duty cycle, the more pre-amplifiers need to be incorporated into the amplifier chain. The output of amplifier stages 20 is then passed through an isolator 24 to a fiber power amplifier 26 for final amplification to an average power level of about 100 W.

Many implementations of the above described general fiber MOPA architecture have been published in the scientific literature, with pulse energies of up to 1 millijoule mJ, average output powers in excess of 100 W, repetition rates between 10 kHz and several MHz, and pulse durations between a few nanoseconds (ns) and hundreds of femtoseconds (fs). Publications include: C. Brooks et al, Optics Express 13(22), 8999, 2005; L. Shah et al, IEEE J. Quant. Electron. 22(3), 552, 2007; K-H. Liao et al., Optics Express 15(8), 4876, 2007; Y. Zaouter et al., Opt. Lett. 33(13), 1527, 2008; G. Chang et al, CLEO 2008; J. Limpert et al., IEEE J. Quant. Electron., 15(1), 159, 2009; and M. J. Leonardo et al., Proc. of SPIE, vol. 7195, 71950F-1, 2009.

A primary limitation of the Fiber MOPA architecture results from non-linear effects in the fibers. Due to a small core size of amplifier fibers, typically tens of micrometers ($\mu$m) in diameter, and a long length of the amplifier fibers (typically several meters), nonlinear effects such as self-phase modulation (SPM) and four-wave mixing lead to an increase in spectral bandwidth of amplified radiation. A narrow spectral bandwidth of typically less than 0.5 nm (FWHM) is required at the infrared signal wavelength to achieve efficient harmonic generation by doubling or sum frequency generation. In addition to these effects, stimulated Raman scattering (SRS) induces an energy transfer from the signal wavelength to a shifted wavelength. Stimulated Brillouin scattering, may lead to the partial reflection of the signal wave and destruction of the fiber system components.

In order to avoid spectral broadening effects pulse energy must be limited at any given pulse duration. By way of example, the pulse energy out of the Yb-doped fiber-amplifier is limited to less than about one microjoule $\mu$J for pulse duration of less than 100 picoseconds (ps), and between about 1 and 20 $\mu$J at longer pulse durations.

A common method of increasing the pulse energy limit is to increase the core diameter of the fiber-amplifier to up to about 40 $\mu$m by using amplifier fibers having a photonic crystal structure. Such fibers have regions of low effective refractive index of the core region, created by arrays of doped and undoped fiber sections. For core diameters between 40 and 100 um, such fibers are also referred to as rod fibers. Using this type of amplifier fiber enables access to pulse energies in excess of 1 mJ in the ns-pulse regime, and, combined with chirped pulse amplification, allows for generation of pulse energies of up to 100 $\mu$J for ps and fs pulses. However, these photonic-crystal fibers are difficult to manufacture and, in addition, suffer from a power degradation process referred to by practitioners of the art as photo-darkening. Chirped-pulse amplification involves the cost and space required for grating based pulse stretchers and compressors.

Another disadvantage of rod-type power-amplifier fibers is that they are relatively inflexible, and very difficult to package in a convenient space. In a relatively low power frequency-converted MOPA system, for example having an average power for fundamental radiation of less than about 50-100 Watts (W), the master oscillator, fiber-amplifier stages, diode-laser arrays for providing optical pump radiation, and one or two stages of harmonic conversion can usually be packaged in a single enclosure having a "footprint" of about 60 centimeters (cm)×20 cm. Power for powering the diode-lasers and other components can be supplied to the enclosure from a separate power supply, via a suitable fiber-cable and electrical connectors. Adding a power amplifier stage comprising a rod-type fiber will require a much greater packaging space.

This is because the power-amplifier fiber will have a large bending radius imposed either by mechanical inflexibility or by bending losses due to a low numerical aperture of the fiber.

There is a need for fiber high-power MOPA architecture that enables output energies above microjoules and up to Joules; does not require chirped pulse amplification; is not subject to degradation by photodarkening, and which can be contained in a package having about the same footprint as a prior-art art low-power MOPA. Preferably this should be accomplished while preserving, as much as possible, above described advantages, of fiber MOPAs that make such fiber MOPAs, preferable to solid state MOPA's.

SUMMARY OF THE INVENTION

In one aspect of the present invention, optical apparatus comprises a master oscillator providing laser-radiation pulses. A plurality of fiber-amplifier stages is arranged sequentially for pre-amplifying the laser-radiation pulses. A multi-pass thin-disk amplifier is arranged for power amplifying the pre-amplified laser-radiation pulses from the fiber-amplifier stages. The thin-disk amplifier includes a thin-disk gain-medium, and a source of optical pump radiation for energizing the thin-disk gain-medium.

In one embodiment of the inventive apparatus, the thin-disk amplifier includes a first optical arrangement for causing multiple incidences of the radiation pulses to be amplified on the thin-disk gain-medium, and a second, separate, optical arrangement for causing multiple incidences of the optical pump radiation on the thin-disk gain-medium. In another embodiment of the inventive apparatus the thin-disk amplifier includes an optical arrangement for causing both multiple incidences of the radiation pulses to be amplified on the thin-disk gain-medium, and multiple incidences of the optical pump radiation on the thin-disk gain-medium.

Use of the multi-pass thin-disk laser amplifier as a final power amplifier stage avoids the above described problems of power amplifying using rod-type or photonic crystal fibers. No chirped pulse amplification arrangements are required for the thin-disk amplifier. Multiple folded optical arrangements used for multi-pass amplification enable the apparatus to be packaged with "footprint" dimensions comparable to those of prior-art low-power fiber-amplifiers. Multiple-pass pumping of the thin-disk gain effectively uses all of the radiation in an optical pump beam.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 6A and FIG. 6B are elevation views schematically illustrating further detail of the arrangement of FIG. 6.

DETAILED DESCRIPTION OF THE INVENTION

Figure 1:
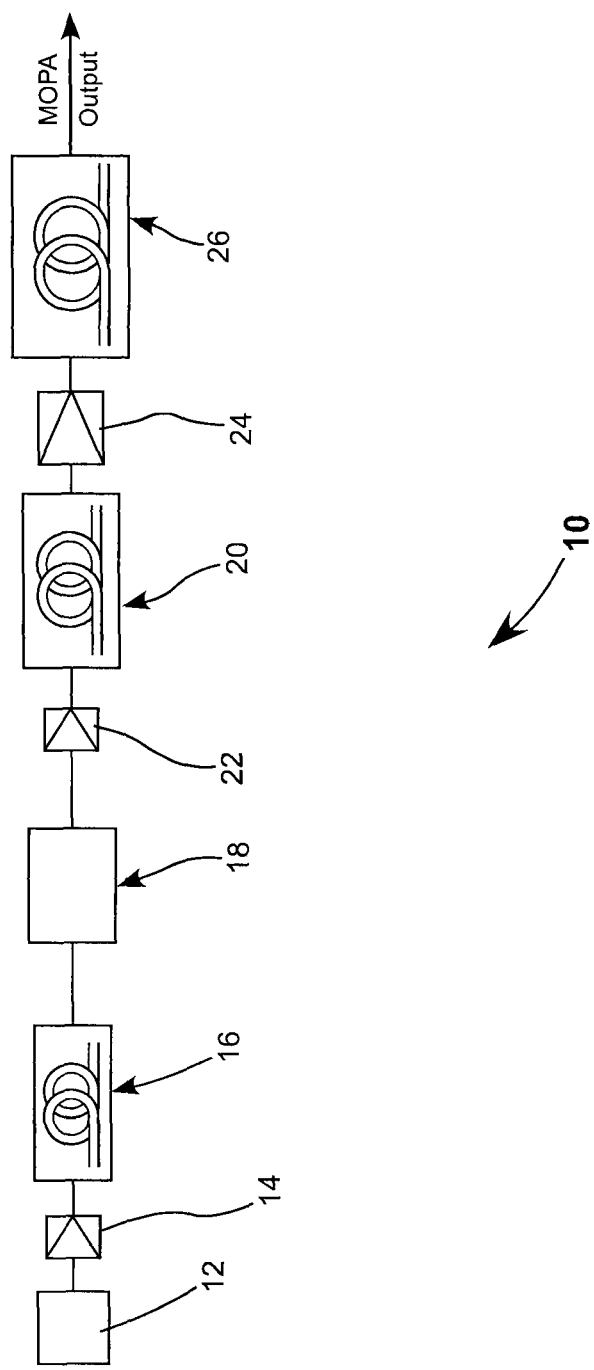
FIG. 1 schematically illustrates a general fiber MOPA architecture including a seed source providing signal radiation, fiber preamplifier stages for pre-amplifying the signal radiation, a modulator or pulse-picker for reducing the duty cycle of the pre-amplified signal radiation, further preamplifier stages for pre-amplifying the reduced-duty-cycle signal radiation and a power amplifier stage for amplifying the pre-amplified reduced-duty-cycle signal radiation to provide output radiation.
Figure 2:
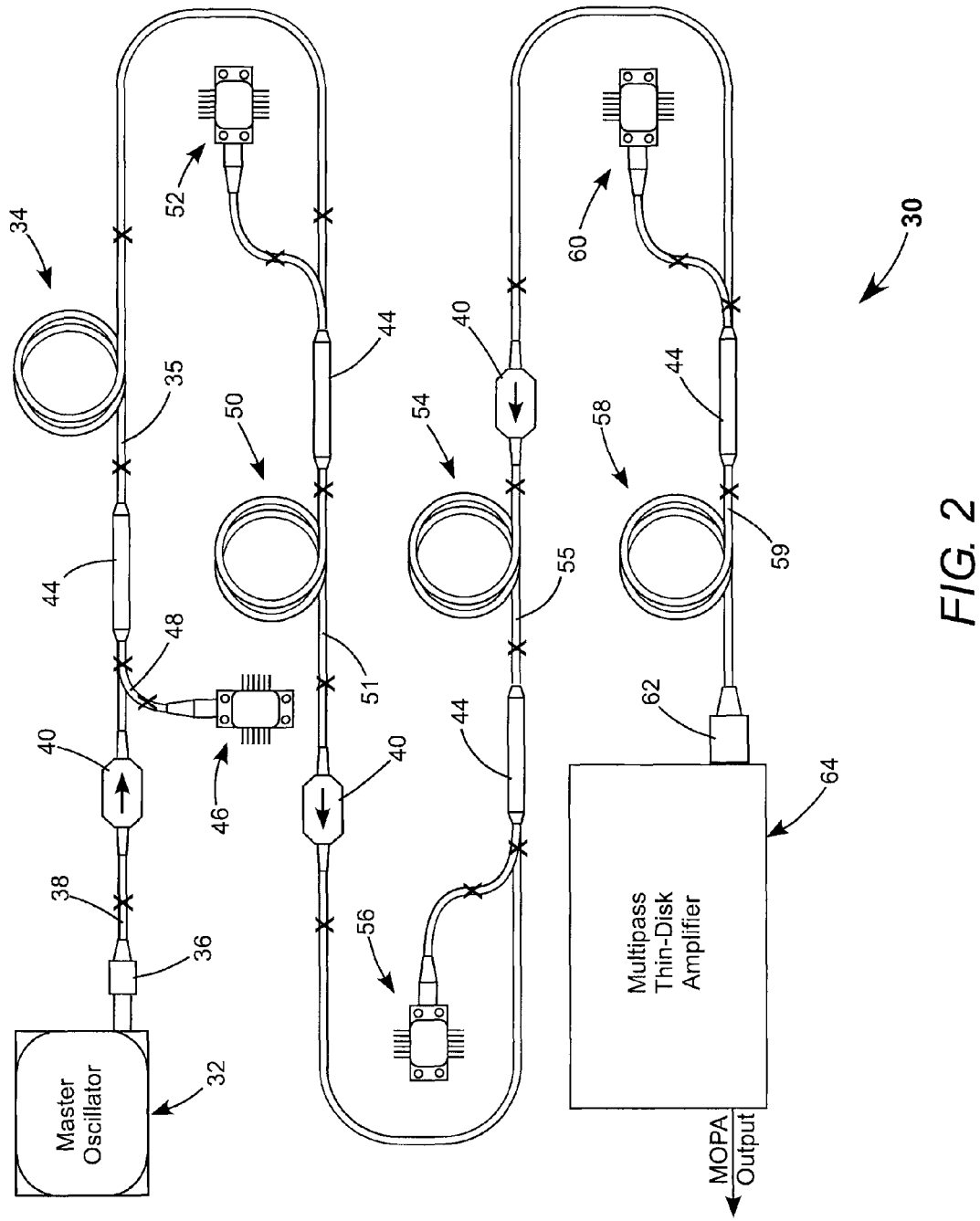
FIG. 2 schematically illustrates a preferred embodiment of a MOPA in accordance with the present invention including a fiber master-oscillator, the output of which is amplified by four stages of fiber amplification, the output of which is further amplified by a multi-pass thin-disk solid state amplifier.

Referring now to the drawings, wherein like components are designated by like reference numerals, FIG. 2 schematically illustrates a preferred embodiment 30 of a MOPA in accordance with the present invention. MOPA 30 includes a master-oscillator (MO) 32 for delivering laser pulses. This can be any prior-art master oscillator including a mode-locked fiber laser, a directly modulated diode-laser or an externally modulated CW laser. Output pulse durations may be in a range between about several femtoseconds (fs) and about 100 nanoseconds (ns). A MOPA in accordance with the present invention is particularly suited for amplifying pulses having a duration between about one picoseconds (ps) and 100 nanoseconds. Pulse repetition frequencies may be in a range between about 10 kHz and 400 MHz. As such fiber oscillators are well known in the art, and a detailed description thereof is not necessary for understanding principles of the present invention, such a detailed description is not presented herein.

Output pulses from master oscillator 32 are delivered to a first fiber-amplifier stage 34 including a length 35 of a gain-fiber, for example an erbium-doped (Er-doped) or Ytterbium-doped (Yb-doped) gain-fiber. The pulses are delivered via a fiber connector 36, a length of fiber 38 an optical isolator 40 and a wavelength division multiplexer (WDM) 44 to the gain-fiber 35. Here it is contemplated that the isolator and WDM are readily available "fiber-pigtailed" components, for convenient splicing to transport fibers, gain-fibers or other fiber pigtailed components. Gain-fiber 35 is optically pumped (energized) by radiation delivered from a diode-laser package 46 via a length of fiber 48 to the WDM 44 between isolator 40 and gain fiber 45.

MOPA 30 includes three further stages 50, 54, and 58 of fiber amplification. Stage 50 includes a gain fiber 51; stage 54 includes a gain-fiber 55; and stage 58 includes a gain-fiber 59. Stage 50 is optically pumped by a diode-laser package 52; stage 54 is optically pumped by a diode-laser package 56; and stage 58 is optically pumped by a diode-laser package 60. In each case radiation from the diode-laser package is delivered to the gain-fiber via a WDM 44. An optical isolator 40 isolates one amplifier stage from the next. In this embodiment it is contemplated that the average power output of the final fiber-amplifier stage 59 is no greater than about 2 Watts (W), and that the gain-fibers are configured such that stretched pulse amplification is not necessary.

Preferably the pulses from master oscillator 32 are plane polarized, and all gain-fibers transport fibers and WDM couplers are polarization maintaining, such that the output of the fiber-amplifier stages is plane-polarized. It is possible to use non polarization maintaining components such that the output of the fiber-amplifier stages is un-polarized. This however could causes losses at the input of isolators 40 and reduce the overall efficiency of the inventive MOPA.

A final amplifier stage in the MOPA is a multi-pass thin-disk power amplifier 64, which replaces the large mode area (LMA) fiber, PCF, or rod-type fiber power-amplifier stage of an above-described prior-art high-power fiber-MOPA arrangement. Output of the fiber-amplifier stages is connected to the thin disk amplifier stage, here via a subminiature "A" (SMA) connector 62. MOPA 30 does not include any pulse stretcher and compressor arrangement of chirped pulse amplification. However, such an arrangement can be used if desired without departing from the spirit and scope of the present invention.

Thin-disk amplifiers include a solid-state gain-medium in the form of a thin disk. Typically such a thin-disk gain-medium has a diameter between about 5 millimeters (mm) and 50 mm and a thickness between about 50 micrometers (μm) and 500 μm. The thin-disk gain-medium has a reflective coating on one surface thereof and is surface-cooled by placing that reflective-coated surface in thermal contact with a heat-sink, which may be actively cooled. Cooling is very effective because of a high surface to volume ratio for the thin-disk. Further, because the surface area of the thin-disk is very much greater than the thickness, heat flow from the thin-disk into the heat sink is essentially unidirectional and in the thickness direction of the thin-disk. This minimizes thermal-lens effects in the gain-medium.

The gain-medium of the thin disk is usually somewhat more highly doped than a conventional bulk solid-state gain-medium. However, because of the small thickness, only a fraction of the pump-radiation directed onto the disk may be absorbed in a single (transmitted and reflected) pass. This, however, can be overcome by arrangements that cause a beam of pump radiation to make multiple incidences on the disk, so that all of the pump-radiation is absorbed in the same manner as all pump-radiation is absorbed in a suitable length of gain-fiber. Multiply folded optical arrangements can be used to cause multiple incidences of radiation to be amplified, and of optical pump radiation, on the thin-disk gain-medium. Such arrangements may be packaged in a space comparable to that which would accommodate a low-power all-fiber MOPA. If active cooling of the thin-disk gain-medium is used, the thin-disk amplifier stage can be packaged together with the fiber-amplifier stages without creating a significantly greater heat load than would be created by the fiber-amplifier stages alone.

Figure 3:
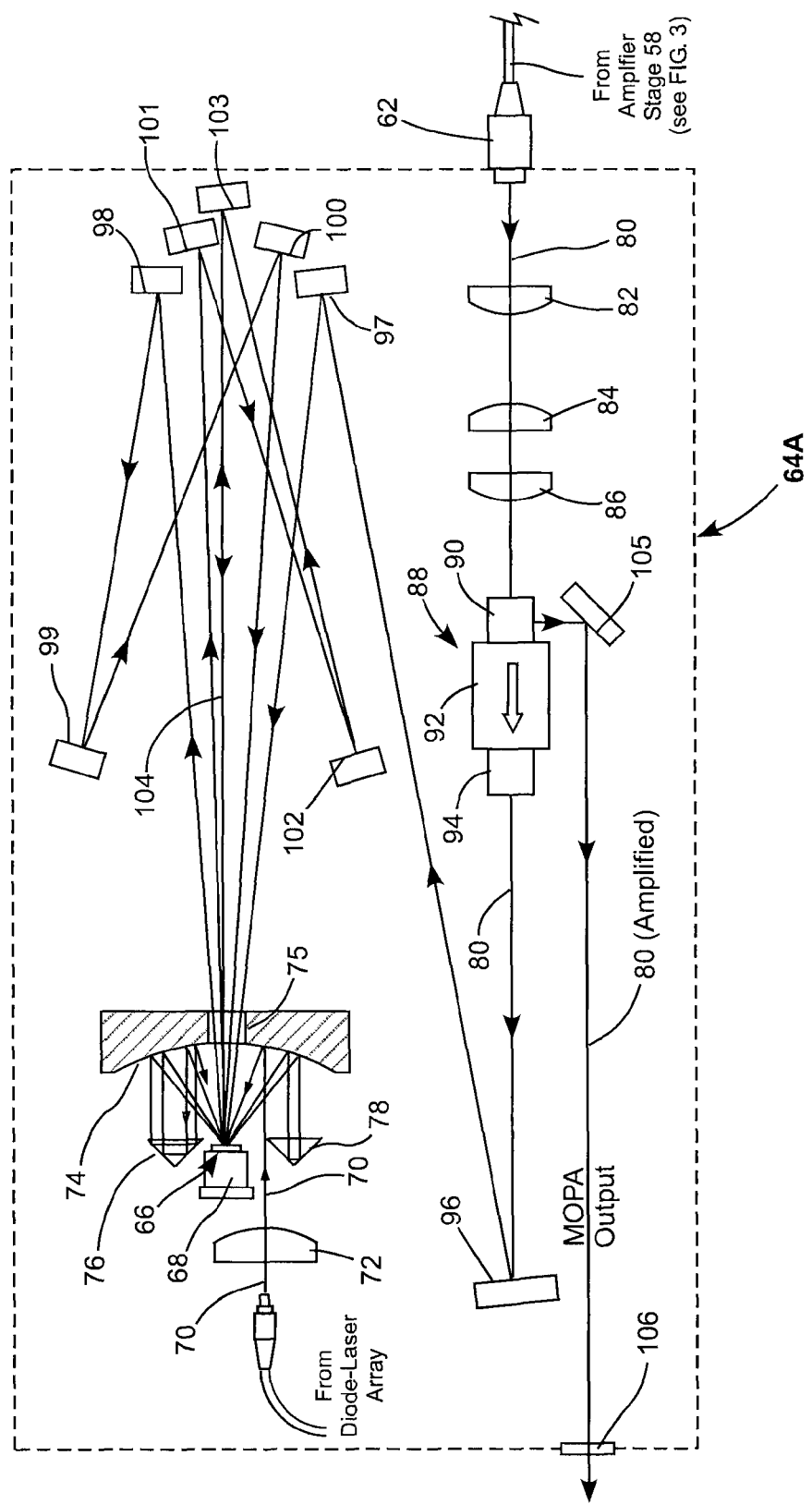
FIG. 3 schematically illustrates one example of a thin-disk multi-pass amplifier suitable for use in the MOPA of FIG. 2 and including a thin-disk gain-medium, one multi-pass optical arrangement for causing multiple incidences on the thin-disk gain-medium of radiation to be amplified, and a separate multi-pass arrangement for causing multiple incidences on the thin-disk gain-medium of optical pump radiation for energizing the thin-disk gain-medium.

FIG. 3 schematically illustrates one preferred example 64A of a multi-pass amplifier suitable for use as thin-disk amplifier 64 in MOPA 30 of FIG. 2. The gain providing element of amplifier 64A is a thin-disk 66 of solid-state gain material such as neodymium-doped yttrium vanadate (Nd:YVO$_4$) mounted on a heat-sink 68. Disk 66 has a reflective backing on the surface thereof in contact with the heat sink. Heat sink 68 may be passively cooled by conduction into a thermal mass, or actively cooled by a flowing cooling fluid.

Disk 66 is energized by a beam 70 of optical pump radiation from a diode-laser array (not shown in FIG. 3). Beam 70 is collimated, here, by a collimating lens 72. Multi-pass pump-optics, here, include a concave mirror 74, preferably a parabolic mirror, and retro-reflecting prisms 76 and 78. Collimated beam 70 is directed onto mirror 74, parallel to the optic axis of the mirror, but laterally displaced therefrom. The prisms are arranged cooperative with the mirror such that the beam 70 makes multiple incidences on disk 66 making a double pass (forward and reverse through the disk at each incidence. The number of incidences can be selected by choosing a particular lateral displacement of beam 70 entering the pump-optics, and particular lateral displacement of prisms 76 and 78.

Disk 66 is preferably spaced at about a focal length of mirror 74 away from the mirror. This provides that the beam 70 is incident at the same spot on the disk 66 for each of the selected number of the incidences. The number of incidences is preferably selected cooperative with the thickness and pump-absorption cross section of the gain-material of the disk such that essentially all of the pump-radiation is absorbed by the disk.

Only sufficient description of the pump optics function is presented above for understanding principles of the present invention. A detailed description of multi-pass pump-radiation optics of this kind is presented in U.S. Pat. No. 6,577,666, the complete disclosure of which is hereby incorporated herein by reference.

Continuing with reference to FIG. 3, a pre-amplified beam 80 is launched into free space from SMA connector 62 of MOPA 30, i.e., from amplifier stage 58 of MOPA 30. Beam-shaping and collimating optics, here, comprising lenses 82, 84, and 86, collimate the beam and shape the cross-section of the beam to a selected cross-section on disk 66, preferably but not exclusively, to match the cross-section of beam 70 on the disk 66 with a ratio of about 0.6:1 and about 0.8:1. The collimated, shaped beam traverses an optical isolator 88 which includes a polarizer 90, a Faraday rotator 92 and a polarization analyzer 94. Such isolators are well known in the optical art and are often referred to as light-valves or optical diodes. Again, it is pointed out that beam 80 (the output of the fiber-amplifier stages of MOPA 30) is preferably plane-polarized, otherwise losses will occur due to resolution of the beam by polarizer 90 of isolator 88.

After traversing isolator 88, beam 80 is directed to multi-pass signal optics including mirrors 96 through 103. The beam is reflected from mirror 96 to mirror 97; form mirror 97 to disk 66; from disk 66 to mirror 98; from mirror 98 to mirror 99; from mirror 99 to mirror 100; from mirror 100 to disk 66; from disk 66 to mirror 101; from mirror 101 to mirror 102; from mirror 102 to mirror 103; and from mirror 103 to disk 66 along a path 104 which is normal to disk 66. The multiply reflected beam accesses disk 66 via an aperture 75 in mirror 74.

Because path 104 directs the beam at a normal incidence onto the disk, beam 80 is reflected back along path 104 to mirror 103 and back along the path of original incidences to isolator 88, making two further (forward and reverse pass) incidences on disk 66 along the way for a total of five incidences. The power of the beam increases on each incidence. On traversing analyzer 94 and Faraday rotator 92, the polarization plane of the beam is rotated at 90° to the original polarization-plane, and, accordingly, is reflected out of the isolator at 90° to the input beam. A steering mirror 105 directs the MOPA output out of the thin-disk amplifier via a window 106 therein.

Figure 4:
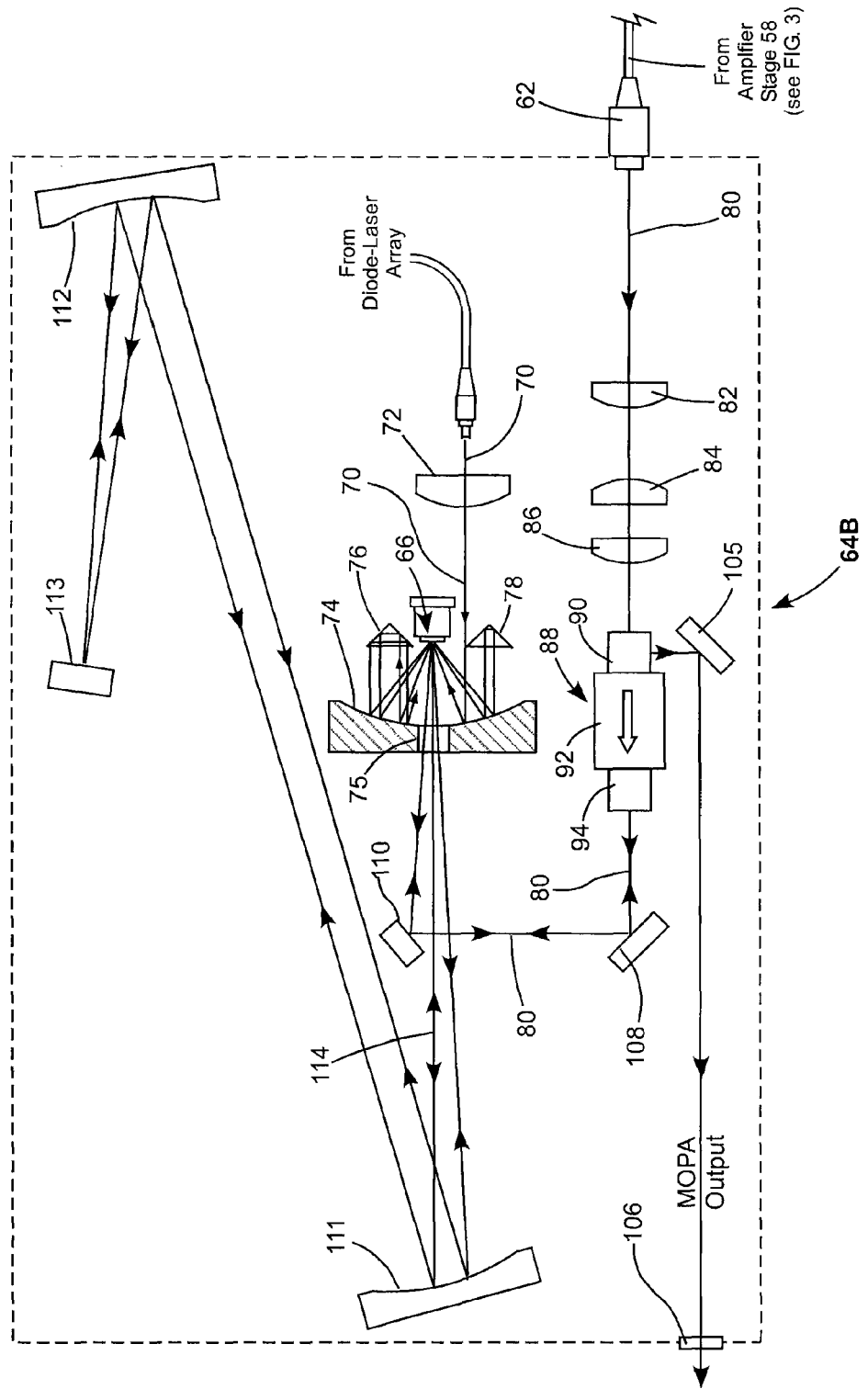
FIG. 4 schematically illustrates another example of a thin-disk multi-pass amplifier suitable for use in the MOPA of FIG. 2 and including a thin-disk gain-medium, similar to the MOPA of FIG. 3 but including an alternative arrangement for causing the multiple incidences on the thin-disk gain-medium of radiation to be amplified.

FIG. 4 schematically illustrates another example 64B of a multi-pass thin-disk amplifier suitable for use in MOPA 30 of FIG. 2. Amplifier 64B is similar to amplifier 64A of FIG. 3 with an exception that a different optical arrangement is used to cause multiple incidences on disk 66 of the beam being amplified. The optical arrangement includes plane mirrors 108, 110 and 113 and concave mirrors (spherical or parabolic) 111 and 112 arranged with concave surfaces facing each other but with the optical axis of one inclined at a slight angle to the optical axis of the other.

In amplifier 64B, beam 80 exiting isolator 88 is directed by plane mirrors 108 and 110 through aperture 75 in concave mirror 74 onto disk 66. The beam is reflected from the disk onto concave mirror 111; reflected from mirror 111 to concave mirror 112; reflected from mirror 112 to plane mirror 113; reflected from mirror 113 to mirror 112; reflected from mirror 112 onto mirror 111; and reflected from mirror 111 onto disk 66 at normal incidence to the disk, with the beam having been twice incident on the disk. The normal incidence causes beam 80 to retrace the incident path back into isolator 88 after making a third incidence on disk 66. The beam is reflected out of polarizer 90 of the isolator as described above, and is then directed by mirror 105 out of amplifier 64B through window 106.

In the above described arrangement for causing multiple incidences of beam 80 on disk 66 mirrors 111 and 112 preferably have the same focal length and are axially separated by twice that focal length. Mirror 113 is separated from mirror 112 by the focal length and disk 66 is separated from mirror 111 by the focal length. This causes the size of beam 80 on disk 66 to be the same at each of the three incidences of the beam thereon. More incidences of the beam 80 on the disk 66 can be achieved by decreasing the inclination of mirror 113 or by moving mirror 110 upwards tilting the mirror to decrease the first incidence angle of beam 80 on thin-disk 66. Those familiar with the optical art can investigate such changes with commercially available optical design software such as ZEMAX available from the ZEMAX Development Corporation of Bellevue, Wash. Those familiar with the optical art using any embodiment or example of the present invention described herein, may use ZEMAX, or similar commercially available optical design software, to design other embodiments without departing from the spirit and scope of the present invention.

Figure 5:
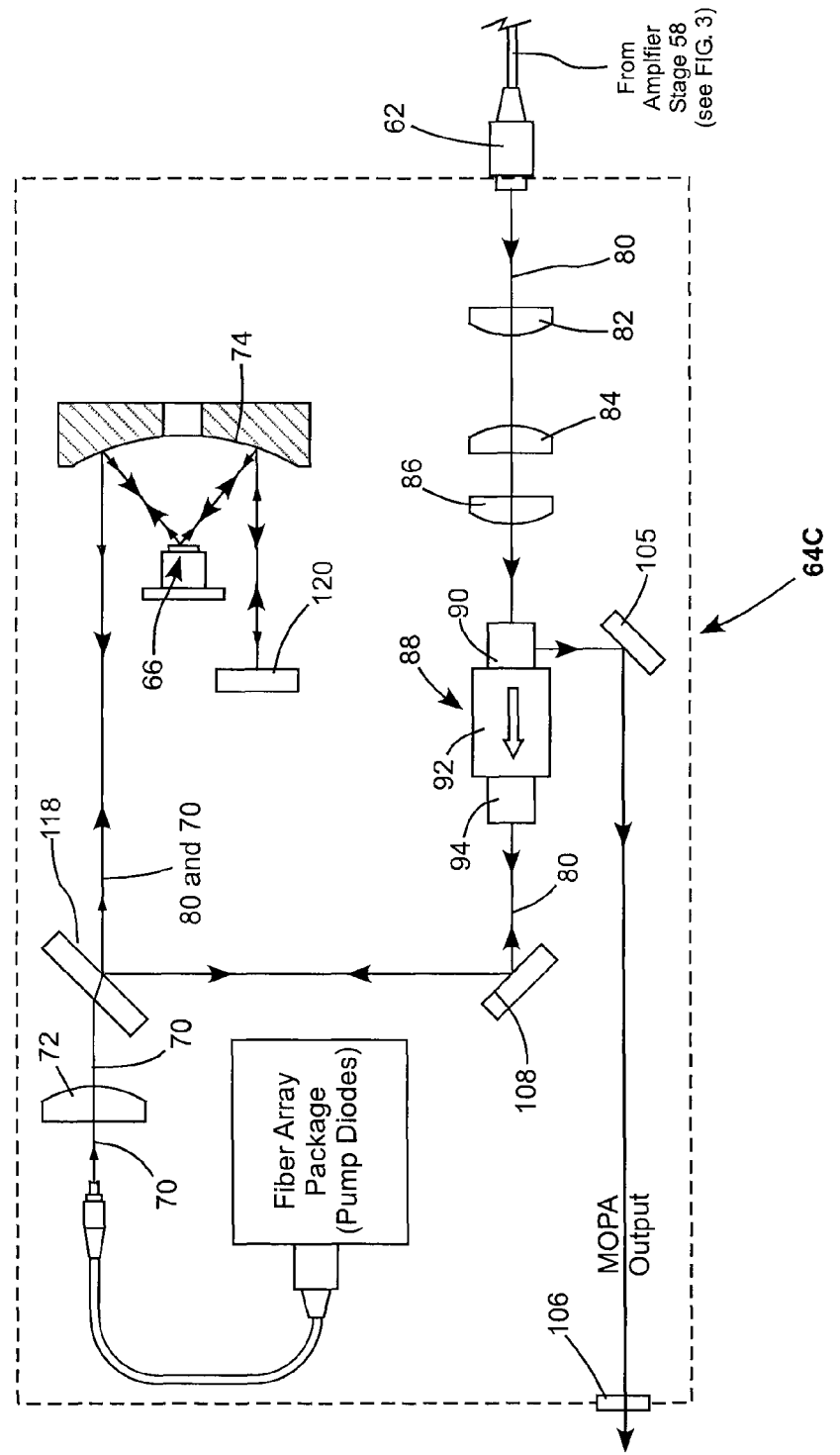
FIG. 5 schematically illustrates another example of a thin-disk multi-pass amplifier suitable for use in the MOPA of FIG. 2 and wherein one optical arrangement provides for causing both multiple incidences on the thin-disk gain-medium of radiation to be amplified and multiple incidences on the thin-disk gain-medium of optical pump radiation for energizing the thin-disk gain-medium.

Above-described thin-disk amplifiers 64A and 64B have in common that separate optical arrangements are provided for causing multiple incidences of a pump-radiation beam and multiple incidences of a beam to be amplified on the thin disk. FIG. 5 schematically illustrates an embodiment 64 C of an amplifier in accordance with the present invention similar to amplifiers 64A and 64B wherein one optical arrangement provides for both multiple incidences of both the pump-radiation beam and the beam to be amplified on the thin disk. That one optical arrangement includes a dichroic mirror 118, which is highly transmissive at the wavelength of pump radiation and highly reflective at the wavelength of radiation to be amplified, parabolic mirror 74, and a plane mirror 120 facing the parabolic mirror but laterally displaced from the optical axis of the mirror.

Beam 80 exits isolator 88 and is directed by steering mirror 108 onto dichroic mirror 118, which reflects the beam toward mirror 74. Pump-radiation beam 70 is transmitted by the dichroic mirror and co-propagates with beam 80. The co-propagating beams are reflected from mirror 74 onto disk 66; reflected from disk 66 back onto mirror 74; and reflected from mirror 74 onto plane mirror 120 at normal incidence thereto. The normal incidence reflection causes the co-propagating beams to retrace the incident pat making a further incidence on disk 66. Power in beam 70 is reduced on each incidence in disk 66 while power in beam 80 is amplified on each incidence. It is assumed, here, for convenience of description, that there is no useful power left in beam 70 after the two incidences on the disk. Amplified beam 80 is directed back into isolator 88 by reflection from dichroic mirror 118 and steering mirror 108. The amplified beam is reflected out of the isolator as described above and delivered from the amplifier as MOPA output radiation.

In most practical cases more than two incidences of the co-propagating beams in disk 66 will be desirable. One way to provide more than two incidences on the disk is to replace mirror 120 with a prism-pair as depicted in pump-radiation optics of the amplifiers of FIGS. 3 and 4. Another prism and mirror arrangement suitable for causing multiple incidences of co-propagating beams is described below with reference to FIG. 6.

Figure 6:
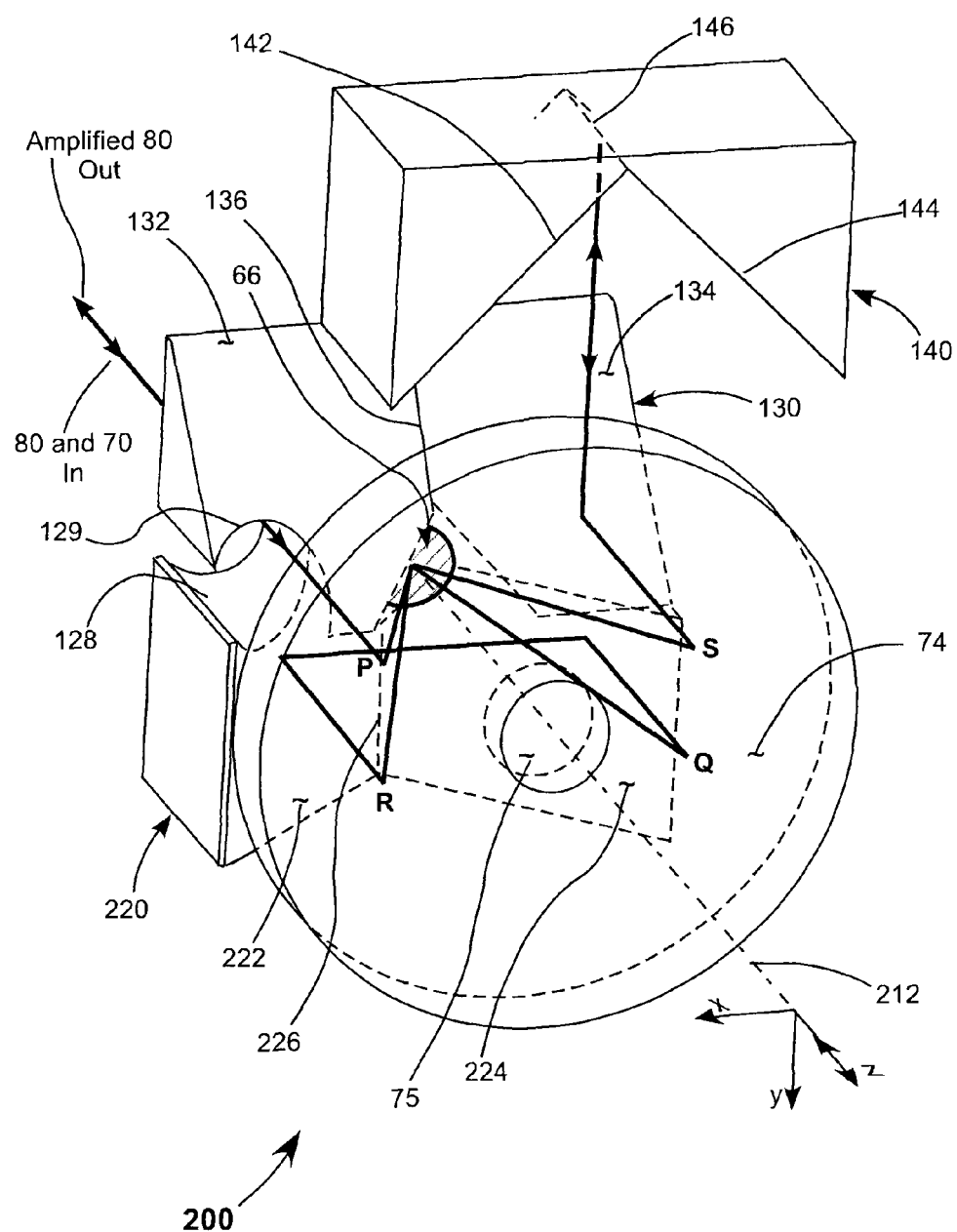
FIG. 6 is a three dimensional view schematically illustrating an alternative optical arrangement for use in the amplifier of FIG. 5 for causing both multiple incidences on the thin-disk gain-medium of radiation to be amplified and multiple incidences on the thin-disk gain-medium of optical pump radiation for energizing the thin-disk gain-medium.

Here, a multi-pass arrangement 200 includes a mirror 74 having aperture 75 therein. In this arrangement mirror 74 is preferably parabolic, but could also be ellipsoidal, purely-spherical, or have some other aspheric shape. In one preferred example, mirror 74 has a focal length of about 60 mm. Mirror 74 is depicted in FIG. 6 as transparent to make visible other components of the apparatus and details of ray paths. The optical axis 212 of mirror 74 can be considered a system longitudinal axis (z-axis). Transverse axes (x- and y-axes) are as depicted.

Arrangement 200 is depicted as directing co-propagating beams 70 and 80 of FIG. 5 onto thin disk gain-medium 66. The thin-disk gain-medium is shaded in the drawing to indicate that it has a reflective backing. The reflective backing can be a reflective optical coating on the disk or a reflective surface on a heat-sink (not shown) with which the thin-disk is in thermal contact. Thin-disk 66 is located on the z-axis at an axial distance about equal to about the focal length (f) of the mirror from reflecting surface 16 in the instant example this is about 60 mm as noted above.

Cooperative with mirror 74 are: a retro-reflecting prism 220 including reflecting surfaces 222 and 224, inclined at 90° to each other, at 45° to the z-axis and parallel to the y-axis, facing the mirror; a plane reflector 130 formed in two parts 132 and 134 with a joint 136 therebetween aligned with the y-axis, each plane reflector part inclined at 45° to the z-axis and parallel to the axis; and a retro-reflecting prism 140 including reflecting surfaces 142 and 144, inclined at 90° to each other, at 45° to the y-axis and parallel to and facing the z-axis.

Those skilled in the optical design art will recognize that while reflecting surfaces 222 and 224, 132 and 134, and 142 and 144 of arrangement 200 are formed as surfaces of prisms, these surfaces could equally well, be stand-alone surfaces with the same alignment. Forming the reflecting surfaces on prisms, however, facilitates alignment, and maintenance of the alignment, of the amplifier components in practice.

Continuing with reference to FIG. 6 and with reference in addition to FIGS. 6A-B, apex 226 of reflecting surfaces 224 and 226 of prism 120 is located on the z-axis at about the same axial distance f from mirror 74 as is thin-disk gain-medium 66. More precisely, the distance would be equal to $0.5*(2*f - D*f^2)$, where D is the dioptric power of the disk. In the instant example, D is assumed to be zero, which will be true in most cases. Apex 146 of reflecting surfaces of 142 and 144 is preferably located at about the same optical path distance from mirror 74 as is the apex of surfaces 222 and 224.

Surface 134 can be adjusted for purposes of symmetry of illumination by moving surface 134 in the z-axis direction as indicated in FIG. 6B by arrow B. Such an adjustment causes the y-axis height of surface 132 to be higher than that of surface 134 at the same z-axis position. This is important in cases where more than 4 incidences of the beam on the mirror are required.

Arrangement is depicted in a basic configuration which will provide for four (4) incidences of co-propagating beams 70 and 80 on thin-disk gain-medium 66. In the drawings, the co-propagating beams are represented by only a single ray for simplicity of illustration.

The co-propagating beams enter arrangement 200, through cut-out portions 128 and 129 of prisms 220 and 130, respectively, parallel to the z-axis. The co-propagating beams are at a distance $x_0$ in the x-axis direction from the z-axis and a distance $-y_0$ in the y-axis direction above the z-axis. These values are dependent on the focal length of mirror 74 inasmuch as they must fall within the clear aperture of the mirror.

This alignment of the beam causes the beam to be incident on mirror 74 at point P and be reflected from point A onto thin-disk 66 on the z-axis. The beam is reflected from the disk to a conjugate point Q $(-x_0, +y_0)$ on mirror 74. The beam is then reflected parallel to the z-axis onto reflective surface 224 of prism 220. Surface 224 reflects the beam parallel to the x-axis onto surface 222 of prism 220. Surface 222 reflects the beam back onto mirror 74 at point R $(x_0, +y_0)$. The beam is reflected from point R back onto thin-disk 66 on the z-axis, re-imaging the disk, i.e., the portion thereof illuminated by the beam, back onto itself without rotation of the polarization orientation of the beam or the image orientation. For this, reason amplifier 200 can be referred to as a polarization-maintaining multi-pass amplifier.

After this first imaging of the thin-disk back onto itself by two incidences of the beam on the thin-disk, the beam is reflected from the disk back onto mirror 74 at point S $(-x_0, -y_0)$. The beam is reflected parallel to the z-axis and is incident on reflective surface 134 at the same x- and y-coordinates. The beam is reflected parallel to the y-axis, is incident on prism 140 at apex 146 thereof, and is reflected, back along the incident path making two further incidences (and two further imagings) on thin-disk 66, in each case without rotation of the polarization plane and without rotation of the disk-image. Following the fourth incidence, amplified beam 80 would be reflected from thin-disk 66 back to point P on mirror 74 and be directed out of the arrangement through cut-out 128 in prism 220, along the input path of the co-propagating beams. It is assumed here that there is no useful power left in pump radiation beam 70.

Increasing the number of incidence to greater than four is effected by translating prism 140 by a predetermined distance towards the z-axis, parallel to the x-axis as indicated in FIG. 7A by arrow A. If the apex 146 of prism 140 is displaced by a distance x to the right of the z-axis where:

$$x = \frac{x_0}{(2n-1)} \quad (1)$$

If n is an integer, then the number of incidences of co-propagating beams 70 and 80 on thin-disk 66 will be equal to 4n. If $x=x_0$, then the number of incidences will be 4, as depicted in FIG. 6.

In the instant example, $x_0$ is equal to −22.148 mm and $y_0$ is equal to 7.5 mm. Reflective surface 134 is translated in the direction of arrow B such that the surface height difference $(y_4)$ between surfaces 132 and 134 at a common z-axis coordinate is equal to $x_0/5$, which is −4.43 mm in the instant example. That is equivalent to shifting surface 134 along the z-axis by the same amount.

If eight (8) incidences of beam 50 on thin-disk 66 are desired, the apex 146 of prism 140 must be located at $x=x_0/3$, i.e., with n=2 in equation (1), from the z-axis, which is −7.3826 mm in the instant example. Further details of prism-mirror combinations of the type depicted in FIG. 6 are provided in U.S. patent application Ser. No. 12/759,465, filed Apr. 13, 2010, assigned to the assignee of the present invention, and the complete disclosure of which is hereby incorporated herein by reference.

The present invention is described above with reference to a preferred and other embodiments. The invention is not limited, however, to the embodiments described and depicted. Rather the invention is limited only to the claims appended hereto.

What is claimed is:

1. Optical apparatus, comprising:
a master oscillator providing laser-radiation pulses;
a plurality of fiber-amplifier stages arranged sequentially for pre-amplifying The laser-radiation pulses; and
a multi-pass thin-disk amplifier including arranged for power amplifying the pre-amplified laser-radiation pulses from the fiber-amplifier stages, the thin-disk amplifier including a thin-disk gain-medium, and a source of optical pump radiation for energizing the thin-disk gain-medium, said thin-disk amplifier including a first optical arrangement for causing multiple incidences of the radiation pulses to be amplified on the thin-disk gain-medium.

2. The apparatus of claim 1, wherein the master oscillator is one of a mode-locked fiber laser, a directly modulated diode-laser or an externally modulated CW laser.

3. The apparatus of claim 1, wherein the pulses provided by the master oscillator have a duration between about 1 picosecond and about 100 nanoseconds.

4. The apparatus of claim 1, wherein the master oscillator provides the pulses of laser radiation at a pulse repetition frequency between about 10 kHz and 400 MHz.

5. The apparatus of claim 1, wherein the thin-disk amplifier includes a separate second optical arrangement for causing multiple incidences of the optical pump radiation on the thin-disk gain medium.

6. The apparatus of claim 1, wherein the optical arrangement is further arranged to cause multiple incidences of the optical pump radiation on the thin-disk gain-medium.

7. The apparatus of claim 6, wherein the radiation pulses and the optical pump radiation propagate on the same path in the optical arrangement.

8. The apparatus of claim 1, wherein the pre-amplified laser pulses are un-polarized.

9. The apparatus of claim 1, wherein the pre-amplified laser pulses are plane-polarized.

10. The apparatus of claim 9, wherein the thin-disk laser amplifier is a polarization-maintaining amplifier.

11. Optical apparatus, comprising:
a master oscillator providing laser-radiation pulses;
a plurality of fiber-amplifier stages arranged sequentially for pre-amplifying the laser-radiation pulses; and
a multi-pass thin-disk amplifier including arranged for power amplifying the pre-amplified laser-radiation pulses from the fiber-amplifier stages, the thin-disk amplifier including a thin-disk gain-medium, a source of optical pump radiation for energizing the thin-disk gain-medium, and an optical arrangement for causing multiple incidences of the radiation pulses to be amplified on the thin-disk gain-medium, and multiple incidences of the optical pump radiation on the thin-disk gain-medium.

12. The apparatus of claim 11, wherein the radiation pulses and the optical pump radiation propagate on the same path in the optical arrangement.

13. The apparatus of claim 11, wherein the pre-amplified laser radiation pulses are plane polarized and the multi-pass thin-disk amplifier is a polarization-maintaining amplifier.

* * * * *